UNITED STATES PATENT OFFICE 1,975,091

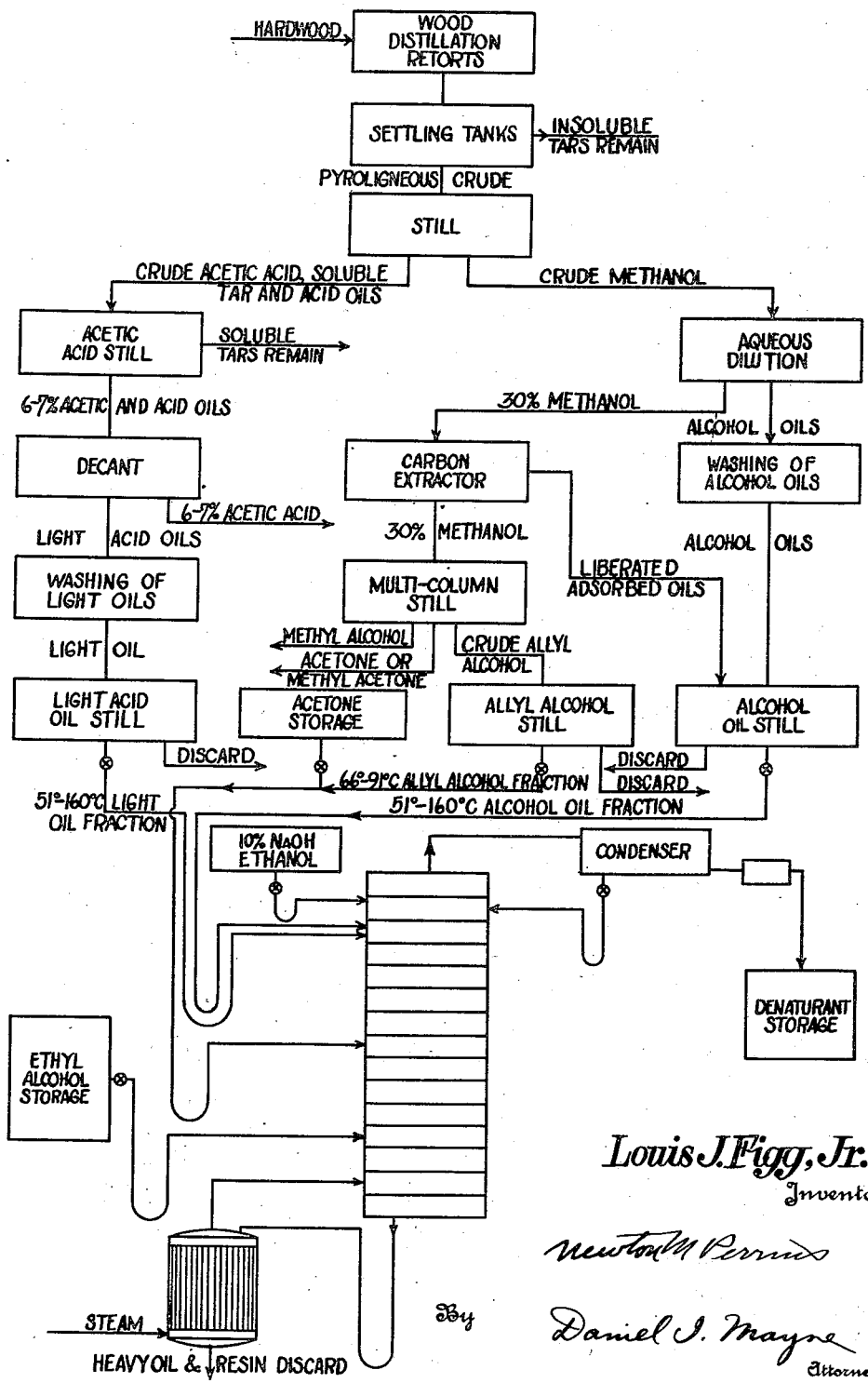

ALCOHOL DENATURANT AND PROCESS OF PREPARING IT

Louis J. Figg, Jr., Kingsport, Tenn., assignor to Eastman Kodak Company, Rochester, N. Y., a corporation of New York Application August 11, 1932, Serial No. 628,381

16 Claims. (Cl. 202—77)

This invention relates to the denaturing of ethyl alcohol, to compositions for use as denaturants, to alcohol so denatured, and to a process of preparing the denaturant.

In my application Serial Number 562,267, filed September 11, 1931, I described a denaturant for ethyl alcohol comprising the washed alcohol oils obtained from wood distillation, namely that resulting from the crude methanol separated from pyroligneous crude. While the denaturant therein described is of great value and makes ethyl alcohol unpalatable, I have now been able to prepare a denaturant which is even more difficult to separate from the alcohol comprising it than the denaturant described in the foregoing application.

While no one to my knowledge has ever been able to prepare a denaturant for ethyl alcohol which will completely defy separation, the denaturant constituting the instant invention is of such an unpalatable character and is so difficult to separate from the ethyl alcohol, that it is totally impractical for the bootlegger to divert alcohol denatured with it into illicit alcohol trade. My denaturant has the advantage that it does not ruin the alcohol for the legitimate industry, such as the lacquer trade, and is non-toxic and non-poisonous, so that in the event alcohol containing it should be taken internally by mistake or ulterior design, it will not cause the death of the imbiber. The effectiveness of this denaturant is evidenced by the recent approval thereof as a denaturant by the U. S. Bureau of Industrial Alcohol.

It is an object of my invention, therefore, to provide a denaturant for ethyl alcohol which makes impractical and unpalatable the use of such ethyl alcohol as a beverage and yet which is non-toxic, non-poisonous and free from methyl alcohol, heretofore so much dreaded by the industry as a denaturant. A further object of my invention is to provide a process for the preparation of that denaturant. Another object of my invention is to provide effectively denatured ethyl alcohol. Further objects will appear to those skilled in the art upon a perusal of this specification.

I have found that by combining the light acid oil fraction, the allyl alcohol fraction and the washed alcohol oil fraction from pyroligneous crude that a most effective denaturant can be provided. These three fractions are effective as a denaturant merely by mixing them in suitable proportions with each other and then adding the mixture to the ethyl alcohol to be denatured, or suitable proportions of each of the three fractions may be added directly to the alcohol to be denatured, or suitable proportions of the three fractions may be mixed with a suitable proportion of a suitable carrier, such as acetone, ethyl alcohol, isopropyl alcohol, isopropyl ether, ethyl methyl ketone, normal propyl alcohol, or other lower alcohol (except methyl), lower ether, or similarly suitable solvent for the three denaturing fractions. Generally speaking, I have found an organic solvent boiling between 55° C. and 99° C. as suitable, although I am not to be limited to that range as it is only illustrative and others will occur to those skilled in the art. This solution of denaturant may then be added to the ethyl alcohol to be denatured. Similarly, I may employ a mixture of any two of these fractions, more particularly the allyl alcohol fraction with either of the oil fractions, or I may employ (less desirably, however) any one of the fractions singly. Preferably, however, these three fractions (or less desirably, any two or any one of them) are fed into a reflux column together with a suitable proportion of one of the carriers above named, such as ethyl alcohol, which refluxing yields a product consisting of, or comparable to, an azeotropic mixture of the three fractions with the carrier, which is an even more effective denaturant than the mere mixture of the three fractions. This refluxing also permits the elimination of volatile organic acids, corrosive contents of the oils and most of any objectionable color and odor connected therewith by suitable saponification, such, for instance, as by the addition of a weak alcoholic solution of sodium hydroxide to the reflux column.

The manner in which these three fractions are produced, combined and refluxed will be fully understood from the following description which is sufficiently illustrative of the manner of carrying out my invention to inform those skilled in the art thereof but by which I do not intend my invention to be limited, such limitations being imposed only by the claims appended hereto.

In the drawing accompanying this specification and forming a part hereof I have illustrated, by a combined flow sheet and diagrammatic sketch, one method by which my invention may be realized.

The production of crude acetic acid and crude methanol by the distillation of hard wood is well known to those skilled in the art and need not be described here in detail. Hard wood cuttings are distilled in suitably heated retorts, giving off a pyroligneous crude, which after the settling out of insoluble tars in suitable settling tanks, is conducted through a bubble plate column still from the top of which issues crude methanol and alcohol oil, and from the bottom of which issues crude acetic acid together with soluble tar and so-called acid oils.

This crude acetic acid-oil mixture is conducted through an acetic acid fractionating column or still from the bottom of which the remaining tar is withdrawn or in the bottom of which the tar collects, 6 to 7% acetic acid together with acid oils issuing from the still as vapors which are condensed and decanted. From the decanter the 6 to 7% aqueous acetic acid layer is withdrawn and conducted to further concentration with which we are not here concerned; the light acid oil layer is also withdrawn, these light oils being washed by, for instance, thoroughly agitating with equal proportions of water to remove any remaining acetic acid, decanting, further washing with 1 to 2% sodium carbonate solution and again decanting. Only a weak alkaline solution is employed for such washing because if a stronger alkaline solution be employed, some of the oils are liable to be taken into solution and wasted or required to be recovered by an additional recovery process. This alkaline wash is also for the purpose of improving color and removing some pyroligneous impurities which may still be present.

The light acid oils are then conducted to a single or multicolumn continuous rectifying still, from which a fraction of light acid oils, boiling between approximately 51° and 160° C., is condensed and withdrawn. This fraction of light acid oil constitutes one of the fractions useful as an element in compounding my novel denaturant.

Returning now to the crude methanol issuing from the crude pyroligneous still, this crude methanol is diluted with sufficient water to produce approximately 30% methanol. The mixture is thoroughly agitated after which two layers are allowed to separate. The oily layer separates out on top, while the water layer is drawn off at the bottom as 30% methanol. These alcohol oils are then washed with an equal proportion of water, the water decanted and the oil again washed with a 1 to 2% solution of sodium carbonate, again decanted and the washed alcohol oil withdrawn. Here, as in the case of the washing of the light acid oils, the alkaline solution should not be too strong as it is liable to dissolve or absorb some of the oils. This alkaline wash is also for the purpose of improving color and removing some pyroligneous impurities which may still be present.

The 30% methanol is conducted through a carbon extractor of a type well known in the art, such as a tall steel cylinder about 10 feet high and two feet in diameter, filled with granular charcoal. This is done for economical reasons because of the fact that 30% methanol contains in adsorbed condition, small quantities of alcohol oils which have not completely separated from the 30% methanol following the dilution of the crude methanol with water. It is not essential that this carbon extractor be placed in the line feeding the 30% methanol to the methanol still, but it is described here in order to show the complete operation of the process. As the 30% methanol passes through this carbon extractor certain oils are adsorbed by the activated charcoal. After the charcoal has adsorbed about as much oil as it will hold, the current of 30% methanol is shut off and the adsorbed oils are liberated with live steam, the vapors condensed, and the oils allowed to separate from the water by stratification. While some alcohol oils may be held in the watery layer and recovered therefrom and added to the liberated adsorbed oils, this is not important. These liberated adsorbed alcohol oils may then be added to the washed alcohol oils, which oils are then conducted to an alcohol oil column still from which an alcohol oil fraction, having a boiling range between approximately 51° and 160° C. is withdrawn. This constitutes the alcohol oil fraction useful as the second element of my novel denaturant. It will be understood that the liberated adsorbed oils from the carbon extractor are of the same general character as the alcohol oils and that they are utilized merely as a matter of economy since they are carried over in solution or suspension in the 30% methanol and otherwise might be wasted or only partially utilized. Accordingly, the alcohol oils are to be understood as being those liberated from the crude methanol by dilution thereof to 30% methanol whether these alcohol oils are decanted off from the diluted crude methanol or obtained by liberation from the carbon extractor, or both. This refined alcohol oil fraction is substantially that described and claimed in my above referred to copending application.

The 30% methanol which passes through the carbon extractor is conducted to a multi column still of known type in the industry. The more columns employed, the more efficient, of course, is the separation of the various fractions and components of the 30% methanol. Accordingly, I have found it preferable for greatest efficiency to employ a four column fractionating still. This multi column still is operated continuously, of course, for greatest efficiency. From this multi column still under properly controlled conditions, known to distillation operators, may be separated a fraction of methyl alcohol, a fraction of methyl acetone and a fraction of crude allyl alcohol. Depending upon the control exercised, an acetone fraction may be separated also, although the acetone fraction normally contains some methyl alcohol and, therefore, has no function in my denaturant. The methyl alcohol fraction and the methyl acetone fraction, likewise, have no place in my novel denaturant. This methyl alcohol fraction is that normally referred to as "Columbian spirits", being possibly 99½% methanol together with a little acetone. The methyl acetone fraction is that well known to the industry, consisting of a mixture of methyl alcohol, acetone, and methyl acetate.

If one desires in connection with this distillation step to obtain pure acetone, it can be accomplished by adding to the foregoing column a solution of calcium chloride or sodium hydrogen sulfite, giving addition products formed by reaction of the calcium chloride or sodium hydrogen sulfite with acetone, which addition products reflux down the column and collect in the base, being later decomposed by steam distillation to give acetone, together, possibly, with some woody impurities, which acetone is, however, free from methanol and may, therefore, be employed in connection with my denaturant if desired, as hereinafter pointed out when referring to acetone.

The crude allyl alcohol is subjected to distillation in a column still, from which is removed an allyl alcohol fraction having a boiling range between approximately 66° and 91° C. This allyl alcohol fraction contains no methanol, although it may contain a small percentage of acetone carried over as an azeotrope. This allyl alcohol fraction constitutes the third element useful in my novel denaturant.

As acetone (free from methanol) has some useful properties in my denaturant, the amount which may be contained in the allyl alcohol fraction is not undesirable and I may even add further acetone (free from methanol) to this allyl alcohol fraction. Therefore, unless otherwise designated, in referring to the allyl alcohol fraction hereinafter, it will be understood to optionally include a small proportion of acetone, if desired.

At this stage I may now produce a denaturant which consists merely of a mixture of these three major fractions above referred to. A very acceptable denaturant may be compounded by mixing together equal parts of the three fractions, namely, the light acid oil fraction, the washed alcohol oil fraction and the allyl alcohol fraction. As I have found that a little smaller proportion of the light acid oil and the allyl alcohol fractions may be employed and still obtain an effective denaturant I may compound my denaturant by employing approximately three parts of the washed alcohol oil, two parts of the light acid oil and 2.5 parts of the allyl alcohol fraction. Many other mixtures in which each fraction constitutes a substantial proportion, as, for instance, about 20% or better, may similarly be utilized. In compounding the denaturant with these three fractions in the ratios above mentioned or ratios roughly similar thereto, I have found that somewhat better dispersion or solution, of the denaturant in the ethyl alcohol to be denatured, occurs if there be added to the denaturant in the mixing thereof approximately ten parts of acetone. I may further dissolve the mixture of the three fractions with or without the added acetone in any desired quantity of ethyl alcohol, such as with equal parts of ethyl alcohol or even with larger quantities of ethyl alcohol, for instance, 8 to 10 parts which final solution may then be employed as the actual denaturant to be added to ethyl alcohol at the producer's plant under government supervision, such as from one to ten parts of the denaturant to 100 parts of the ethyl alcohol to be denatured, depending upon the dilution of the three fractions with acetone or ethyl alcohol.

As pointed out in my above mentioned application, the washed alcohol oils themselves make an acceptable denaturant but I have found that in combination with a suitable proportion of the allyl alcohol fraction, preferably plus some acetone, a very effective denaturant is produced. Similarly, the light acid oil fraction may be employed alone as an effective denaturant or one may mix therewith suitable proportions of the allyl alcohol fraction to obtain a better denaturant. I may also employ a mixture of the alcohol oil fraction and the light acid oil fraction, but this is not as effective as either or both of these fractions with the allyl alcohol fraction added thereto. In the foregoing mixtures, equal parts may be employed or minor proportions of the allyl alcohol fraction may be used for compounding with either of the other fractions. As adverted to earlier herein, I may employ other suitable carriers besides ethyl alcohol. Therefore, in making a mixed denaturant I may use acetone, isopropyl alcohol, isopropyl ether, ethyl methyl ketone, normal propyl alcohol, or other carrier in this class as the carrier instead of or together with ethyl alcohol.

I have found, however, that a denaturant of even more desirable properties may be prepared by refluxing preferably the three fractions above referred to with one of the suitable carriers above named, such, for instance, as ethyl alcohol, in a manner of which the following is illustrative.

As shown by the accompanying diagram, a multi plate column of any desired height is employed for refluxing the three fractions. While other types of columns might be employed, the type having fractionating plates with bubble cups is to be preferred because of its efficiency and ease of control. A column of approximately twenty plates will serve the purpose very well. The light acid oil fraction and the washed alcohol oil fraction are introduced near the top of this column, as, for instance, at the second or third plate from the top thereof, so that these fractions, being heavy, will reflux substantially the entire length of the column. The allyl alcohol fraction is preferably introduced into the column somewhere near the center thereof, for instance at approximately the tenth plate from the top of this size column. With the allyl alcohol fraction, I may introduce into the column the desired amount of acetone, in order that the allyl alcohol will more homogeneously combine and reflux through the column with the remaining elements of my denaturant. Then, at about one third of the distance up the column, as, for instance, at the sixth or seventh plate from the bottom thereof, I introduce the desired amount of a suitable carrier, such as ethyl alcohol, to operate as a carrying agent, so to speak, for the other elements of my denaturant.

Connected with the top of the column is a suitable water-cooled condenser provided with a return pipe for refluxing back a portion of the condensate. A base heater is, of course, provided for the column, it being supplied by a draw-off pipe from the bottom of the column, the top of the base heater, of course, being connected back to the column at about the second plate thereof, so as to continuously drive back into the column any vapors which should be included in the final product.

In addition, I have found it desirable to admit at the top of the column in small amounts a relatively weak alcohol solution of caustic, such, for instance, as 10% of sodium hydroxide in ethanol, although this is a matter of choice, depending upon the clarity and purity of the product desired. The sodium hydroxide solution causes heavy woody impurities, such as would give a bad color and odor to the product, to be removed from the product although it will be understood that if color and odor are not important, this caustic reflux may be dispensed with.

The various fractions, together with the acetone and ethyl alcohol admitted to the column are metered, such as by weirs, valves, metering pumps, or the like, so that the proper proportions of the various elements are admitted to the column to obtain a product having the most desirable properties of the various elements of the denaturant.

One of the preferred embodiments of this form of my invention is to introduce into the column in metered proportions somewhat as follows—

|  | Parts |
|---|---|
| Light acid oil fraction | 2 |
| Washed alcohol oil fraction | 3 |
| Allyl alcohol fraction | 2.5 |
| Acetone | 10 |
| Ethyl alcohol | 82.5 |

The temperature of the column is so controlled that the completed product is driven off from the top of the column at a rate of approximately 20 gallons per minute, if a twenty plate column 6 feet in diameter is used. Approximately one-half of the condensate may be returned to the top of the column for refluxing back therein, and the admission of the various elements to the column are so metered or controlled as to permit of the foregoing speed of operation. The extremely high boiling portions of the various fractions which are incapable of passing off from the top of the column, of course, reflux down to the base heater from which they may be continuously or periodically withdrawn.

A striking discovery from the operation of the foregoing process is that the denaturant produced is actually an azeotropic mixture having a substantially constant boiling point or range thereof, which is entirely different from the elements contributing to that azeotrope. In other words, it will be observed that the boiling points of the elements entering into my invention range from approximately 51° C. to 160° C.

However, the denaturant produced in accordance with the foregoing method has properties differing from each of the elements and also differing from what would be expected from a mere mixture thereof. For instance, the product produced in accordance with the above preferred embodiment of my invention has a specific gravity of .82 at 60° F. and has a boiling range commencing at 70° C. and ending at 80° C. The product gives a clear or only slightly opalescent solution when 10 cc. of alcohol denatured therewith (100 parts of ethyl alcohol to 5 parts of denaturant) is added to 90 cc. of distilled water. The acetone content, it will be apparent amounts to approximately 10 grams of acetone per 100 cc. of denaturant, although this, of course, depends entirely upon how much acetone is added to the reflux column along with the other elements comprising the denaturant. The ester content of the denaturant will be found to be exceedingly low, being in the neighborhood of one-half to one percent. Since the denaturant contains a proportion of unsaturated pyroligneous bodies, these may be tested by any of the various bromine absorption methods. The methanol content of the denaturant is practically nil. Full specifications of a desirable denaturant made in accordance with my invention are set forth in Gen. Cir. #117, July 8, 1932 of the Bureau of Industrial Alcohol, U. S. Treasury Department.

Inasmuch as the active elements of my preferred denaturant comprise the three fractions alluded to, it will be apparent that the acetone may be omitted from the refluxing operation, if desired, when employing any of the other carriers named. Likewise, the acetone content may be varied substantially at will, although it is advisable not to add acetone in proportions beyond approximately two parts of acetone to one part of the total fractions added, as otherwise the denaturant would be too dilute in character for the greatest effectiveness. The proportion of ethyl alcohol added as a carrier to the column may be likewise varied within considerable limits, as it will be apparent that beyond the proportions of alcohol reasonably necesasry to obtain a proper reflux, the denaturant is not detrimentally affected by the addition of ethyl alcohol inasmuch as it is the same product as that to which the denaturant will be later added. I have found that the ratio of from 8 to 10 parts of ethyl alcohol to one part of the remaining elements added to the column is sufficient to obtain good refluxing conditions and, accordingly, the addition of further alcohol would merely involve loading the column with an unreasonable proportion of alcohol which would be a waste of heat and storage. The ethyl alcohol employed in refluxing may be undenatured 95% ethyl alcohol, although it will be quite apparent that one may utilize alcohol which has already been denatured with my denaturant or even any other denaturant which does not deleteriously affect my finished product.

While I have described preferred proportions which may be admitted to the reflux column, in order to prepare my novel denaturant, it will be quite apparent that considerable latitude is permissible in varying the proportions of each of the three fractions entering the reflux column. For instance, equal proportions of each of the three fractions may be employed, or one or two of the fractions may be employed in lesser amounts, for instance, one or two of the fractions may be employed in proportions as low as approximately 20% of the total value of the three fractions admitted. The manner in which these proportions may be varied will be apparent to those skilled in the art once they become acquainted with the advantages which each of the three fractions contribute to the final product. It will also be apparent that by increasing the proportions of the higher boiling constituents entering the reflux, the boiling range of the final denaturant will be slightly raised, at least in its upper limit and that by introducing into the reflux, larger proportions of acetone, ethyl alcohol or other carrier, the initial boiling point of the final denaturant will be slightly lowered, although within the limits herein stated a large portion of the denaturant obtained will be found to distill over between 70° and 80° C. In most instances at least 95% of my denaturant distills over below about 85° C.

While above I have described ethyl alcohol as the carrier in producing my refluxed denaturant I may employ with substantially equal effectiveness, many other carriers of similar solvent properties toward the fractions used, such, for instance, as acetone, isopropyl alcohol, isopropyl ether, ethyl methyl ketone, normal propyl alcohol, other lower alcohols (except methyl), lower ethers, and the like organic solvents having a boiling range falling generally between 55° and 99° C. Mixtures of these may also be employed. In the event acetone is desired as the carrier, it may all be added with the allyl alcohol fraction or part therewith and part at the bottom third of the column as in the case of the other carriers.

Also in producing a refluxed denaturant I may use any two or even one of the fractions above referred to. As a two fraction reflux the allyl alcohol fraction may preferably be used as one fraction and either the light acid oil fraction or the washed alcohol oil fraction in equal or predominating proportions used as the other. I may, of course, use the two oil fractions or I may use only one of the three fractions. Reflux conditions when employing less than three fractions are similar to those employed when all three fractions are utilized. The boiling range of the finished denaturant will, of course, vary as the heavier or lighter fractions and various carriers employed predominate but such ranges will fall generally between about 70° and 80° C.

I have found that ethyl alcohol may be quite effectively denatured by employing five parts of either the refluxed denaturant or the mixed denaturant per one hundred parts of ethyl alcohol to be denatured. The amount of my denaturant which may be employed depends entirely upon two factors, namely, the minimum which may be as low as two parts or even one part per one hundred parts of ethyl alcohol depends upon the degree of impediment which it is desired to place in the way of the illicit alcohol trade, and the maximum which may be any amount desired depends entirely upon the use to which the product is to be put, for instance, one would not want to add to the alcohol so much denaturant that it would impede or obscure the useful properties of the ethyl alcohol itself, in, for instance, the lacquer industry.

Furthermore, if desired, there may be added to my denaturant various loading compounds for various purposes. For instance, gasoline may be added thereto in small proportions, such as 10% of the denaturant, in order to give turbidity to any mixture of the denatured alcohol with water. Other substances having a characteristic and desirably repulsive odor may likewise be added to the denaturant as a warning to the possible illicit consumer that the alcohol is entirely unfit for beverage purposes. Various other additions may be made to my denaturant in order to give certain additional properties thereto, such, for instance, as "pinesol" and similar pine oil products obtained by the leaching of hogged pine wood by means of low boiling petroleum fractions. Suffice it to say, however, that these various addition agents are not necessary in any way to the effectiveness of my denaturant and are entirely optional depending upon the use to which the alcohol is to be put and the character of the trade through whose hands it passes.

Numerous other variations to my invention will be apparent to those skilled in the art, it being understood that the foregoing is illustrative of the manner in which my invention may be accomplished and that it is to be in no way limited except by the claims appended hereto.

Having thus described my invention, what I claim and desire to secure by Letters Patent of the United States is:

1. A substantially methanol-free denaturant for ethyl alcohol, the major proportion of which boils below 85° C., comprising a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

2. A substantially methanol-free denaturant for ethyl alcohol, the major proportion of which boils below 85° C., comprising a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude, together with a carrier therefor.

3. A substantially methanol-free denaturant for ethyl alcohol, the major proportion of which boils below 85° C., comprising a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude, together with acetone.

4. A substantially methanol-free denaturant for ethyl alcohol, the major proportion of which boils below 85° C., comprising a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude, together with ethyl alcohol.

5. A substantially methanol-free denaturant for ethyl alcohol, the major proportion of which boils below 85° C., comprising a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude, together with isopropyl alcohol.

6. A substantially methanol-free denaturant for ethyl alcohol, the major proportion of which boils below 85° C., comprising an allyl alcohol fraction the major proportion of which boils between approximately 66° and 91° C. and a fraction selected from the group consisting of a washed alcohol oil fraction the major proportion of which boils between approximately 75° and 160° C. and a light acid oil fraction the major proportion of which boils between approximately 75° and 160° C., all of which fractions are obtained from the distillation of pyroligneous crude.

7. A substantially methanol-free denaturant for ethyl alcohol, the major proportion of which boils between 70° and 80° C., comprising the product resulting from the refluxing with a carrier of a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

8. A substantially methanol-free denaturant for ethyl alcohol, the major proportion of which boils between 70° and 80° C., comprising the product resulting from the refluxing with ethyl alcohol of a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

9. A substantially methanol-free denaturant for ethyl alcohol, the major proportion of which boils between 70° and 80° C., comprising the product resulting from the refluxing with acetone of a light acid oil fraction the major proportion of which boils between approximately 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

10. A substantially methanol-free denaturant for ethyl alcohol, the major proportion of which boils between 70° and 80° C., comprising the product resulting from the refluxing with isopropyl alcohol of a light acid oil fraction the major proportion of which boils between approximately 75° C. and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

11. The process of preparing a denaturant for ethyl alcohol, the major proportion of which denaturant boils between 70° and 80° C., which comprises refluxing with a carrier a light acid oil fraction the major proportion of which boils between 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

12. The process of preparing a denaturant for ethyl alcohol, the major proportion of which denaturant boils between 70° and 80° C., which comprises refluxing with acetone a light acid oil fraction the major proportion of which boils between 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

13. The process of preparing a denaturant for ethyl alcohol, the major proportion of which denaturant boils between 70° and 80° C., which comprises refluxing with ethyl alcohol a light acid oil fraction the major proportion of which boils between 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

14. The process of preparing a denaturant for ethyl alcohol, the major proportion of which denaturant boils between 70° and 80° C., which comprises refluxing with isopropyl alcohol a light acid oil fraction the major proportion of which boils between 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude.

15. The process of preparing a denaturant for ethyl alcohol, the major proportion of which denaturant boils between 70° and 80° C., which comprises refluxing with a carrier an allyl alcohol fraction the major proportion of which boils between approximately 66° and 91° C., and a fraction selected from the group consisting of a washed alcohol oil fraction the major proportion of which boils between approximately 75° and 160° C., and a light acid oil fraction the major proportion of which boils between 75° and 160° C., all of which fractions are obtained from the distillation of pyroligneous crude.

16. The process of preparing a denaturant for ethyl alcohol, the major proportion of which denaturant boils between 70° and 80° C., which comprises refluxing with a carrier a light acid oil fraction the major proportion of which boils between 75° and 160° C., a washed alcohol oil fraction the major proportion of which boils between approximately 75° and 160° C., and an allyl alcohol fraction the major proportion of which boils between approximately 66° and 91° C., obtained from the distillation of pyroligneous crude, the carrier and fractions being fed into the refluxing equipment in approximately the proportions in which they exist in azeotropic mixture resulting from the refluxing operation, and condensing the azeotropic mixture of vapors issuing from the refluxing operation.

LOUIS J. FIGG, JR.

CERTIFICATE OF CORRECTION.

Patent No. 1,975,091.        October 2, 1934.

LOUIS J. FIGG, JR.

It is hereby certified that error appears in the printed specification of the above numbered patent requiring correction as follows: Page 4, line 99, for "value" read volume; and that the said Letters Patent should be read with this correction therein that the same may conform to the record of the case in the Patent Office.

Signed and sealed this 8th day of January, A. D. 1935.

Leslie Frazer (Seal)                         Acting Commissioner of Patents.